United States Patent
Krishna

(10) Patent No.: US 9,819,668 B2
(45) Date of Patent: Nov. 14, 2017

(54) SINGLE SIGN ON FOR NATIVE AND WRAPPED WEB RESOURCES ON MOBILE DEVICES

(71) Applicant: CA, INC., New York, NY (US)

(72) Inventor: Vikas Krishna, San Jose, CA (US)

(73) Assignee: CA, INC., New York, NY (US)

( * ) Notice: Subject to any disclaimer, the term of this patent is extended or adjusted under 35 U.S.C. 154(b) by 132 days.

(21) Appl. No.: 14/520,643

(22) Filed: Oct. 22, 2014

(65) Prior Publication Data

US 2016/0119323 A1   Apr. 28, 2016

(51) Int. Cl.
*H04L 29/06* (2006.01)
*G06F 21/41* (2013.01)

(52) U.S. Cl.
CPC .......... *H04L 63/0815* (2013.01); *G06F 21/41* (2013.01)

(58) Field of Classification Search
CPC ..... G06F 21/31; G06F 21/41; H04L 63/0815; H04L 63/10; H04L 63/0853; H04L 63/0807; H04L 63/0823; H04L 63/083; H04L 9/3226; H04L 9/3263
USPC .............................................. 726/4, 5, 8, 9
See application file for complete search history.

(56) References Cited

U.S. PATENT DOCUMENTS

| | | | | |
|---|---|---|---|---|
| 8,296,828 B2 * | 10/2012 | Dalzell | ................... | G06F 21/41 713/168 |
| 9,152,781 B2 * | 10/2015 | Sowatskey | ............ | G06F 21/335 |
| 2009/0235346 A1 * | 9/2009 | Steinberg | .............. | G06F 21/445 726/8 |
| 2011/0197070 A1 * | 8/2011 | Mizrah | ............... | H04L 63/0869 713/176 |
| 2011/0314533 A1 * | 12/2011 | Austin | .................... | H04L 63/08 726/9 |
| 2014/0068743 A1 * | 3/2014 | Marcus | ................... | G06F 21/33 726/8 |
| 2014/0082715 A1 * | 3/2014 | Grajek | ................ | H04L 63/0815 726/8 |

(Continued)

OTHER PUBLICATIONS

Mobile single sign-on solution for enterprise cloud applications, Spoorthi et al, 10.1109/CNSC.2014.6906717, IEEE, Sep. 2014.*

(Continued)

*Primary Examiner* — Jahangir Kabir
(74) *Attorney, Agent, or Firm* — Sage Patent Group

(57) ABSTRACT

A method includes performing operations as follows on a processor: associating a single sign on module with a native application residing on a mobile device, detecting, using the single sign on module, user invocation of the native application, the native application to request access to a resource from a service provider server, determining, using the single sign on module, whether the mobile device has a token stored thereon that indicates the user has been previously authenticated with an identity provider server, sending, using the single sign on module, the token to the identity provider server when the token is determined to be stored on the mobile device, receiving, at the single sign on module, an identity assertion for the user from the identity provider server responsive to sending the token to the identity provider server, and providing, using the single sign on module, the identity assertion to the native application. The service provider server is independent of the identity provider server.

17 Claims, 9 Drawing Sheets

(56) References Cited

U.S. PATENT DOCUMENTS

| | | | | |
|---|---|---|---|---|
| 2014/0317716 A1* | 10/2014 | Chao | ............... | H04L 63/10 |
| | | | | 726/9 |
| 2015/0089620 A1* | 3/2015 | Manza | ............... | H04L 63/0838 |
| | | | | 726/8 |
| 2015/0180868 A1* | 6/2015 | Sng | ............... | H04L 63/0884 |
| | | | | 726/9 |
| 2015/0188906 A1* | 7/2015 | Minov | ............... | H04L 63/0815 |
| | | | | 726/8 |
| 2015/0254450 A1* | 9/2015 | Ravi | ............... | G06F 21/41 |
| | | | | 726/8 |
| 2016/0021097 A1* | 1/2016 | Shrotri | ............... | H04L 63/0815 |
| | | | | 726/8 |

OTHER PUBLICATIONS

A New Kind of Single Sign-On Model Base on Mobile Agent, Zhigang, 10.1109/ICIECS.2010.5678203, IEEE, Dec. 2010.*

* cited by examiner

SINGLE SIGN ON FOR NATIVE AND WRAPPED WEB RESOURCES ON MOBILE DEVICES

BACKGROUND

The present disclosure relates to computing systems, and, in particular, to security management of mobile devices and/or applications.

Enterprises have employees and/or customers that download applications onto their mobile devices, such as smart phones, tablets, laptops, and the like. These applications may allow the users to access various types of content and data belonging to the enterprise. Because mobile devices may be more susceptible to being stolen, misplaced, or compromised in some way, enterprises may deploy a set of security tools known as Mobile Application Management (MAM) or Enterprise Mobility Management (EMM) tools that may provide a security layer around the mobile applications. These MAM/EMM tools may be used to provide security functionality with respect to the mobile applications, the content accessed by the mobile applications, and/or the data used by the mobile applications. The MAM/EMM tools may implement rules and/or policies to ensure that the applications/content/data are secure. For example, users may be asked to enter credentials for accessing native applications on a mobile device or when accessing Web resources, such as mobile Web applications. Entering credentials every time a native application and/or Web resource is accessed can be cumbersome for a user as mobile devices can be relatively small and difficult to type on. Storing credentials locally on the mobile device for re-use may eliminate the need for a user to re-type the credentials every time an application and/or Web resource is accessed. But storing the credentials locally may present a security risk as mobile devices are more susceptible to being lost.

SUMMARY

In some embodiments of the inventive subject matter, a method comprises performing operations as follows on a processor: associating a single sign on module with a native application residing on a mobile device, detecting, using the single sign on module, user invocation of the native application, the native application to request access to a resource from a service provider server, determining, using the single sign on module, whether the mobile device has a token stored thereon that indicates the user has been previously authenticated with an identity provider server, sending, using the single sign on module, the token to the identity provider server when the token is determined to be stored on the mobile device, receiving, at the single sign on module, an identity assertion for the user from the identity provider server responsive to sending the token to the identity provider server, and providing, using the single sign on module, the identity assertion to the native application. The service provider server is independent of the identity provider server.

In other embodiments of the inventive subject matter, a method comprises performing operations as follows on a processor: associating a single sign on module with a browser residing on a mobile device, detecting, using the single sign on module, user invocation of a Web resource via the browser, sending, using the single sign on module, a token to an identity provider server, the token indicating that the user has been previously authenticated with the identity provider server, receiving, at the single sign on module, an identity assertion for the user from the identity provider server responsive to sending the token to the identity provider server, and providing, using the single sign on module, the identity assertion to the browser. The service provider server is independent of the identity provider server In still other embodiments of the inventive subject matter, a computer program product comprises a tangible computer readable storage medium comprising computer readable program code embodied in the medium that when executed by a processor causes the processor to perform operations comprising: associating a single sign on module with a native application residing on a mobile device, detecting, using the single sign on module, user invocation of the native application, the native application to request access to a resource from a service provider server, determining, using the single sign on module, whether the mobile device has a token stored thereon that indicates the user has been previously authenticated with an identity provider server, sending, using the single sign on module, the token to the identity provider server when the token is determined to be stored on the mobile device, receiving, at the single sign on module, an identity assertion for the user from the identity provider server responsive to sending the token to the identity provider server, and providing, using the single sign on module, the identity assertion to the native application. The service provider server is independent of the identity provider server.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
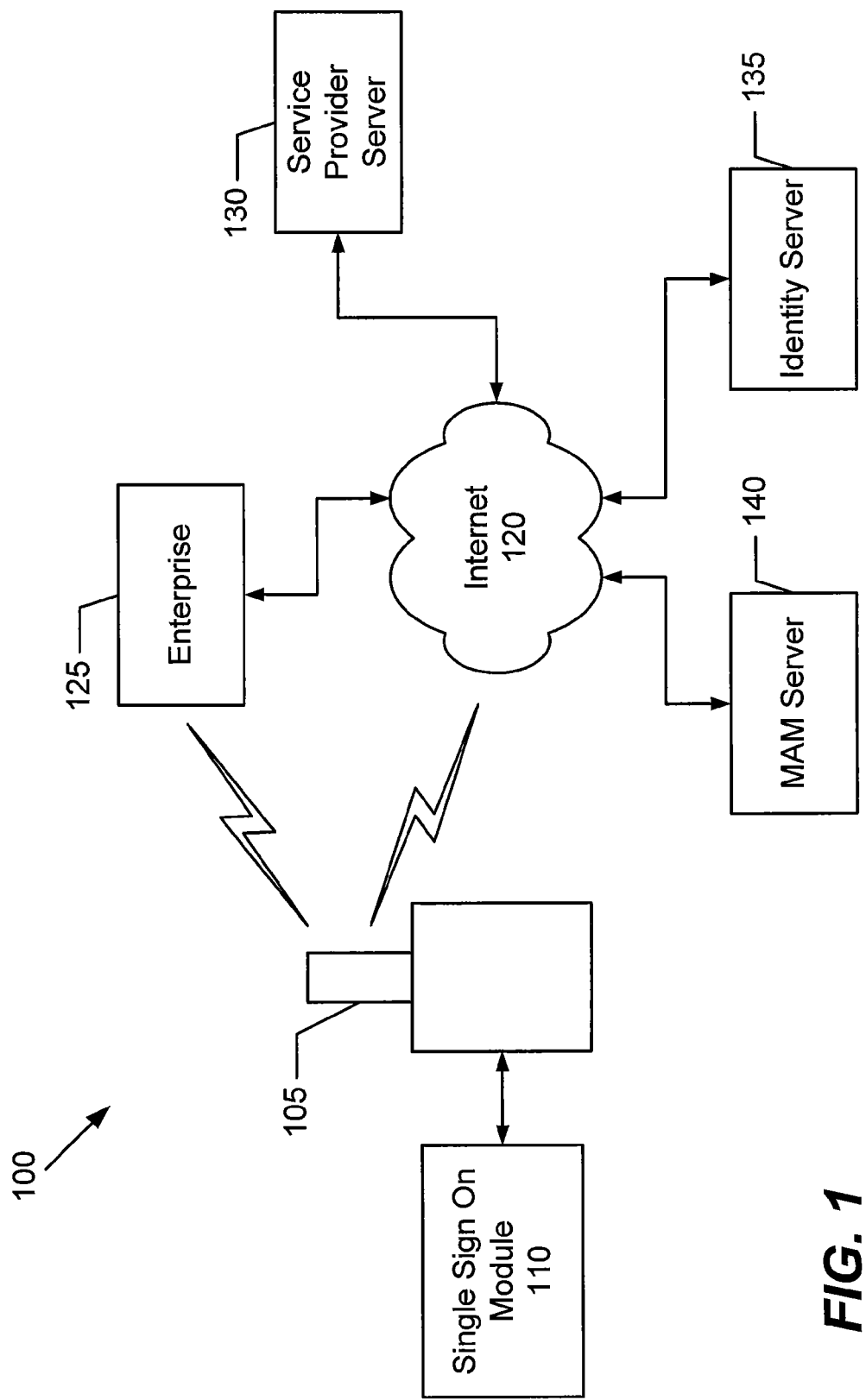
FIG. 1 is a block diagram of a communication network in which a Single Sign On (SSO) capability is provided for a mobile device in accordance with some embodiments of the inventive concept.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals or mobile devices may also be referred to as "pervasive computing" devices.

Some embodiments of the inventive subject matter stem from a realization that for native applications and browsers residing on a mobile device, a Single Sign On (SSO) module may be used to communicate with an identity provider server to retrieve an identity assertion, such as a Security Association Markup Language (SAML) identity assertion, to be used when invoking a native application. For accessing a mobile Web application via a URL through a browser running on the mobile device, the SSO module may cause the user request for access mobile Web application to be redirected to the identity provider to retrieve the identity assertion to be used when accessing the mobile Web application via the URL.

FIG. 1 is a block diagram of a communication network in which a Single Sign On (SSO) capability is provided for a mobile device in accordance with some embodiments of the inventive concept. Employees and/or customers of an enterprise, for example, may use mobile devices, such as smart phones, tablets, laptops, and the like to access various types of content and data belonging to the enterprise. As shown in FIG. 1, a mobile device 105 may be used to communicate with an enterprise 125 (i.e., enterprise server(s)) using a direct wireless connection or via various networks, which are represented by the Internet 120. In addition to communicating with the enterprise 125, the mobile device may also communicate with other external service provider servers 130 to access Web resources, such as mobile Web application(s), and/or exchange data and content therewith. Because mobile devices are typically more susceptible to being stolen, lost, or compromised versus desktop computing devices, the enterprise 125 may use Mobile Applications Management (MAM)/Enterprise Mobility Management (EMM) tools to provide additional security functionality with respect to the mobile applications, the content accessed by the mobile applications, and/or the data used by the mobile applications. As described above, the MAM/EMM tools may implement rules and/or policies to ensure that the enterprise's applications/content/data are secure by requiring enhanced login credentials depending on the time of day the application is being accessed (e.g., not during work hours), the geographic location of the mobile device, and the like. Content/data associated with the applications by enforcing various restrictions and policies that limit access to the content/data.

For example, users may be asked to enter credentials for accessing native applications on a mobile device or when accessing Web resources, such as mobile Web applications. Storing credentials locally on the mobile device for re-use may eliminate the need for a user to re-type the credentials every time an application and/or Web resource is accessed, but storing the credentials locally may present a security risk as mobile devices are more susceptible to being lost. Thus, MAM/EMM tools may implement rules or policies preventing users from storing credentials locally on a mobile device. According to embodiments of the inventive subject matter, a MAM server 140 may provide a SSO module 110 that can be downloaded to the mobile device either directly or, for example, through the enterprise 125. The SSO module 110 may be associated with native applications and/or browsers that run on the mobile device 105 to provide a SSO capability. The SSO module 110 may communicate with an identity server 135 to obtain an identity assertion that can be used when accessing a native application on the mobile device 105 and/or when accessing a Web resource, such as a mobile Web application provided through the service provider server 130.

As shown in FIG. 1, the connections between the enterprise 125, service provider server 130, identity server 135, and MAM server 140, and the mobile device 105 may include wireless and/or wireline connections and may be direct or include one or more intervening local area networks, wide area networks, and/or the Internet. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks.

Although FIG. 1 illustrates a system for providing a SSO capability for a mobile device according to some embodiments of the inventive subject matter it will be understood that embodiments of the present invention are not limited to such configurations, but are intended to encompass any configuration capable of carrying out the operations described herein.

Figure 2:
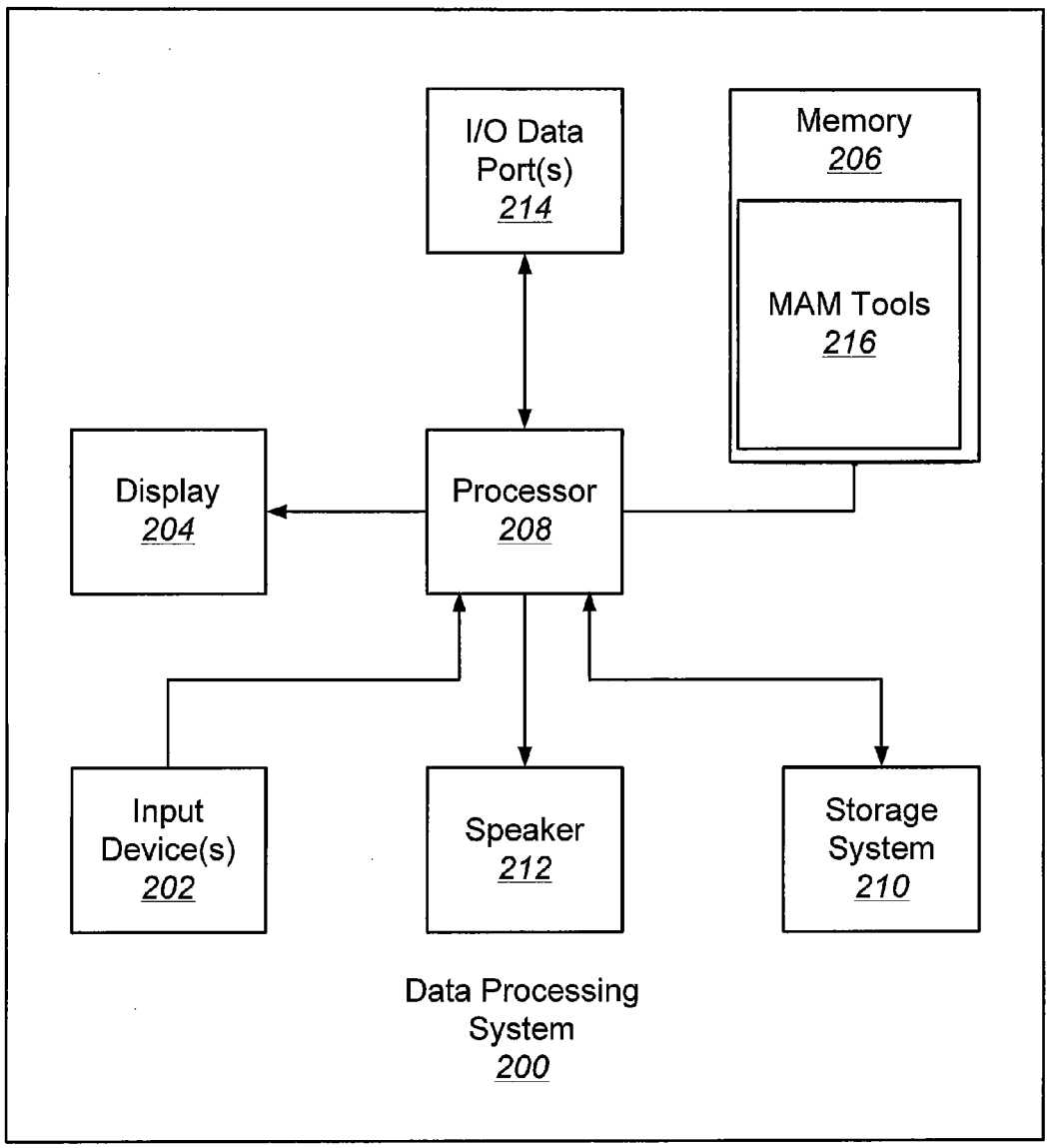
FIG. 2 illustrates a data processing system that may be used to implement the Mobile Applications Management (MAM) server of FIG. 1 in accordance with some embodiments of the inventive subject matter.

Referring now to FIG. 2, a data processing system 200 that may be used to implement the MAM server 140 of FIG. 1, in accordance with some embodiments of the inventive subject matter comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a MAM tools module 216 that may be configured to provide one or more MAM tool, policies, rules, and the like for mobile devices according to some embodiments of the inventive subject matter.

Figure 3:
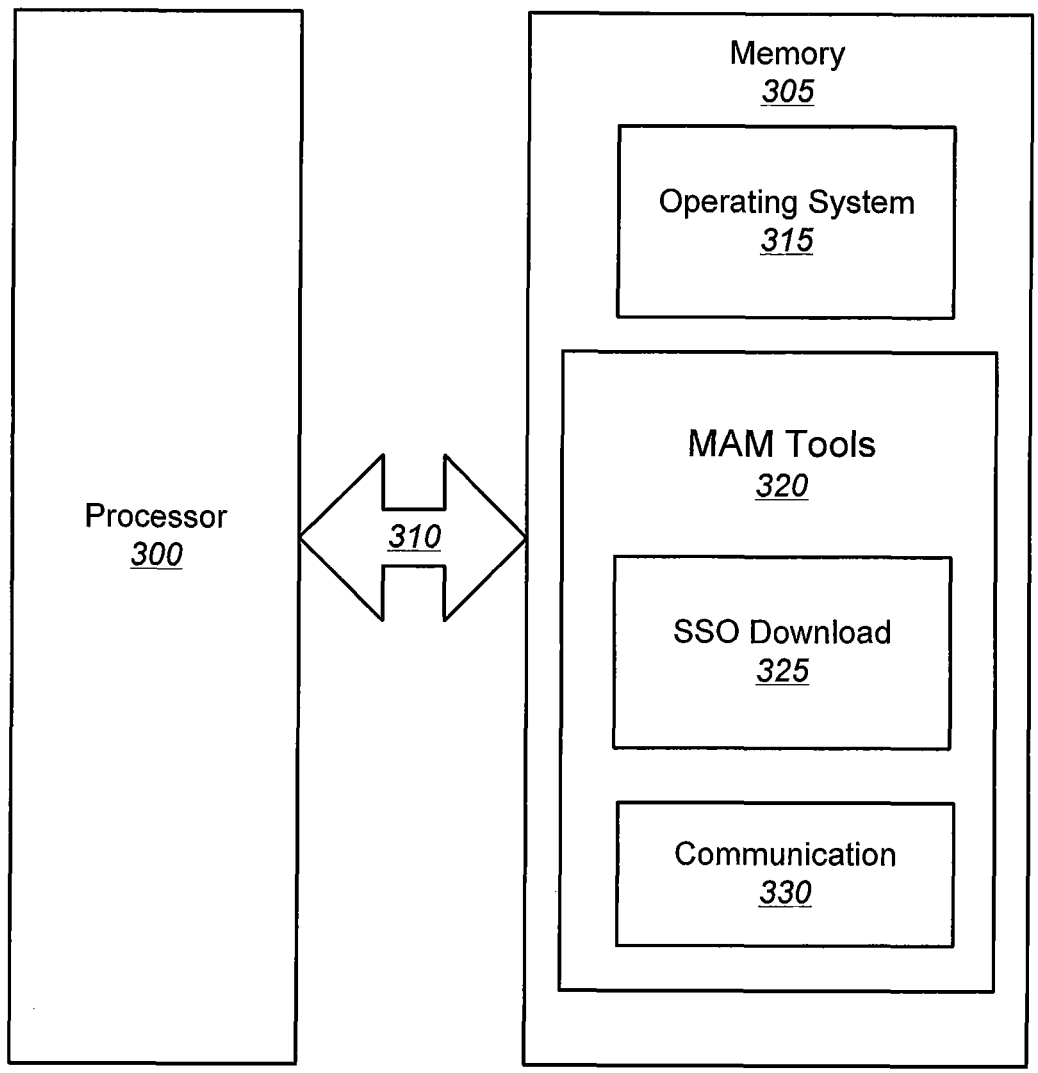
FIG. 3 is a block diagram that illustrates a software/hardware architecture for the MAM server of FIG. 1 in accordance with some embodiments of the present inventive subject matter.

FIG. 3 illustrates a processor 300 and memory 305 that may be used in embodiments of data processing systems, such as the MAM server 140 of FIG. 1 and the data processing system 200 of FIG. 2, respectively, for providing MAM tools, policies, rules, and the like to mobile devices, according to some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for providing MAM tools, policies, rules, and the like in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain up to two or more categories of software and/or data: an operating system 315 and a MAM tools module 320. The operating system 315 generally controls the operation of the data processing system. In particular, the operating system 315 may manage the data processing system's software and/or hardware resources and may coordinate execution of programs by the processor 300. The MAM tools module 320 may comprise an SSO download module 325 and a communication module 330. The SSO download module 325 may provide the SSO module 110 shown in FIG. 1 that can be downloaded to a mobile device either directly from the MAM server 140 or indirectly through the enterprise 125, for example. The communication module 330 may be configured to facilitate communication between the MAM server 140 and other entities, such as the mobile device 105 and enterprise 125.

Although FIG. 3 illustrates hardware/software architectures that may be used in data processing systems, such as the MAM server 140 of FIG. 1 and the data processing system 200 of FIG. 2, respectively, for providing MAM tools, policies, rules, and the like to mobile devices, according to some embodiments of the inventive subject matter, it will be understood that the present invention is not limited to such a configuration but is intended to encompass any configuration capable of carrying out operations described herein.

Figure 4:
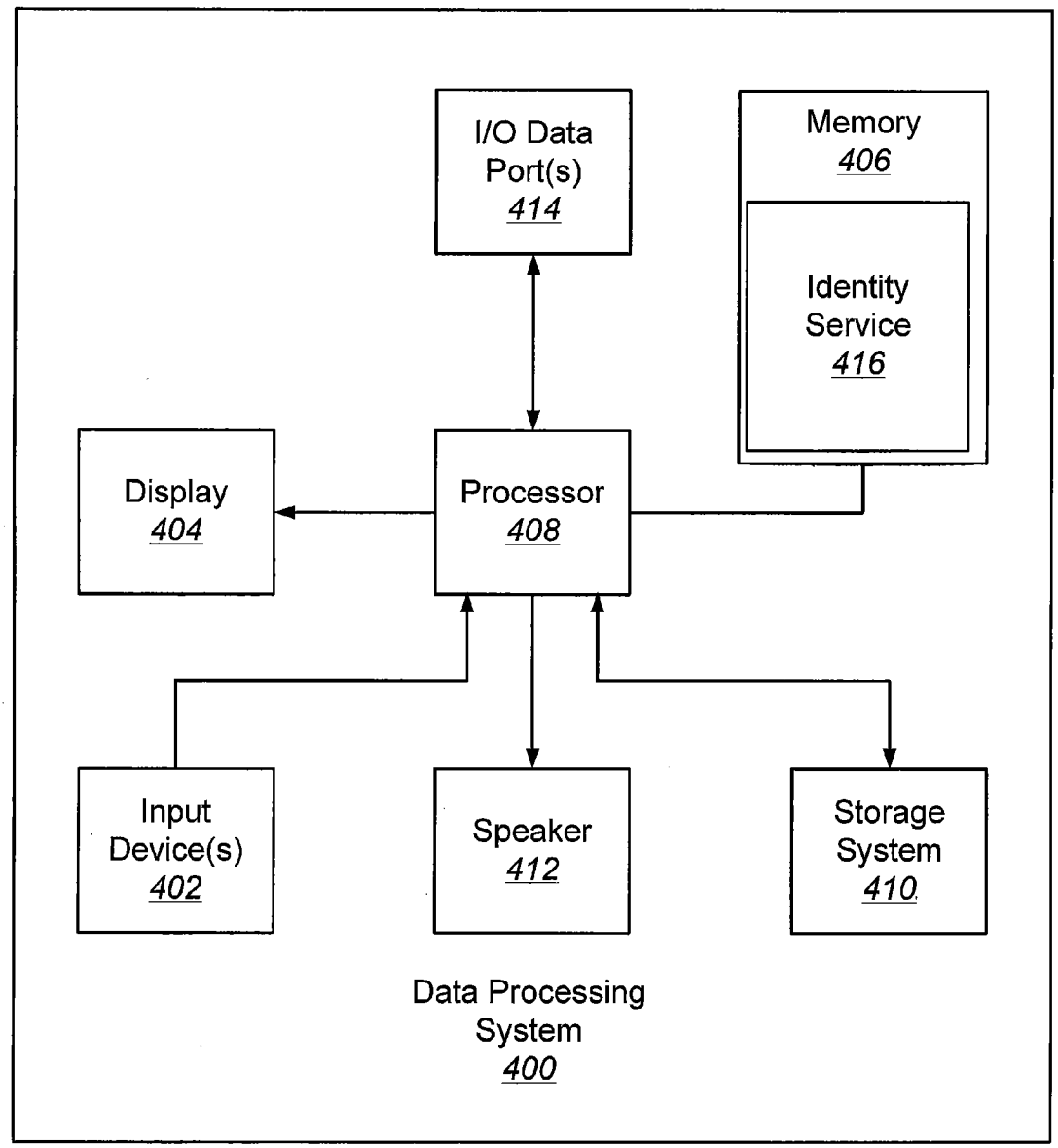
FIG. 4 is a block diagram that illustrates a data processing system that may be used to implement the identity server of FIG. 1 in accordance with some embodiments of the inventive subject matter.

Referring now to FIG. 4, a data processing system 400 that may be used to implement the identity server 135 of FIG. 1, in accordance with some embodiments of the inventive subject matter comprises input device(s) 402, such as a keyboard or keypad, a display 404, and a memory 406 that communicate with a processor 408. The data processing system 400 may further include a storage system 410, a speaker 412, and an input/output (I/O) data port(s) 414 that also communicate with the processor 408. The storage system 410 may include removable and/or fixed media, such as floppy disks, ZIP drives, hard disks, or the like, as well as virtual storage, such as a RAMDISK. The I/O data port(s) 414 may be used to transfer information between the data processing system 400 and another computer system or a network (e.g., the Internet). These components may be conventional components, such as those used in many conventional computing devices, and their functionality, with respect to conventional operations, is generally known to those skilled in the art. The memory 406 may be configured with an identity service module 416 that may be configured to authenticate a user's identity typically at the request of a third party, such as the mobile device 105, one or more service providers 130, or the like according to some embodiments of the inventive subject matter.

Figure 5:
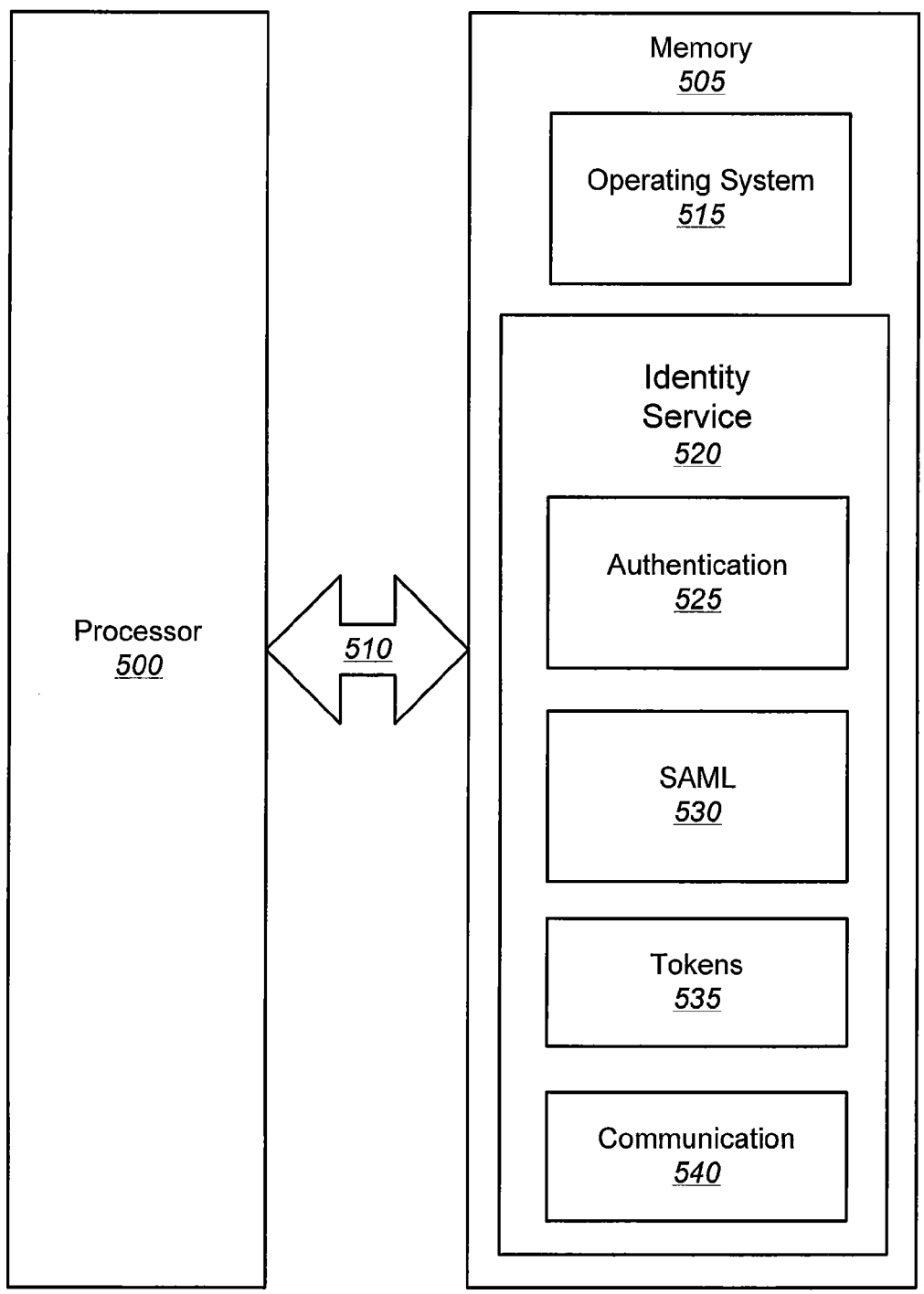
FIG. 5 is a block diagram that illustrates a software/hardware architecture for the identity server of FIG. 1 in accordance with some embodiments of the inventive subject matter.

FIG. 5 illustrates a processor 500 and memory 505 that may be used in embodiments of data processing systems, such as the identity server 135 of FIG. 1 and the data processing system 400 of FIG. 4, respectively, for authenticating the identity of a user, such as a user of the mobile device 105, according to some embodiments of the inventive subject matter. The processor 500 communicates with the memory 505 via an address/data bus 510. The processor 500 may be, for example, a commercially available or custom microprocessor. The memory 505 is representative of the one or more memory devices containing the software and data used for authenticating the identity of a user, such as a user of the mobile device 105, in accordance with some embodiments of the inventive subject matter. The memory 505 may include, but is not limited to, the following types of devices: cache, ROM, PROM, EPROM, EEPROM, flash, SRAM, and DRAM.

As shown in FIG. 5, the memory 505 may contain up to two or more categories of software and/or data: an operating system 515 and an identity service module 520. The operating system 515 generally controls the operation of the data processing system. In particular, the operating system 515 may manage the data processing system's software and/or hardware resources and may coordinate execution of programs by the processor 500. The identity service module 520 may comprise an authentication module 525, a Security Association Markup Language (SAML) module 530, a tokens module 535, and a communication module 540. The authentication module 525 may be configured to authenticate a user, such as a user of the mobile terminal 105. The authentication module 525 may receive identity credentials, such as a user name and user password, and authenticate the user based on these credentials. This is an example, however, and it will be understood that various authentication techniques can be used, such as multi-factor authentication in which the authentication module receives identity credentials comprising answers to multiple questions to be used in the multi-factor authentication process.

The SAML module 530 may be configured to generate a SAML identity assertion that confirms the user's identity and which can be sent to an entity requesting authentication of the user, such as the mobile device 105. In SAML, one identity provider may provide SAML identity assertions to many entities, e.g., service providers, mobile terminals, and the like. Similarly, one service provider, mobile terminal, or the like may rely on and trust identity assertions from many independent identity servers. It will be understood that embodiments of the present inventive subject matter are not limited to SAML identity assertions and other types of identity assertions can be used in other embodiments.

The tokens module 535 represents electronic information that can be passed between the identity server 135 and an entity requesting authentication of a user. When identity credentials for a particular user are provided to the identity server 135, the identity server 135 may provide a token to the requesting entity that can be used when requesting a identity assertion from the identity server 135 so as to alleviate the need for the user to re-enter the identity credentials.

The communication module 540—may be configured to facilitate communication between the identity server 135 and other entities, such as the mobile device 105 and service provider server 130.

Although FIG. 5 illustrates hardware/software architectures that may be used in data processing systems, such as the identity server 135 of FIG. 1 and the data processing system 400 of FIG. 4, respectively, for authenticating the identity of a user, such as a user of the mobile device 105, according to some embodiments of the inventive subject matter, it will be understood that the present invention is not limited to such a configuration but is intended to encompass any configuration capable of carrying out operations described herein.

Figure 6:
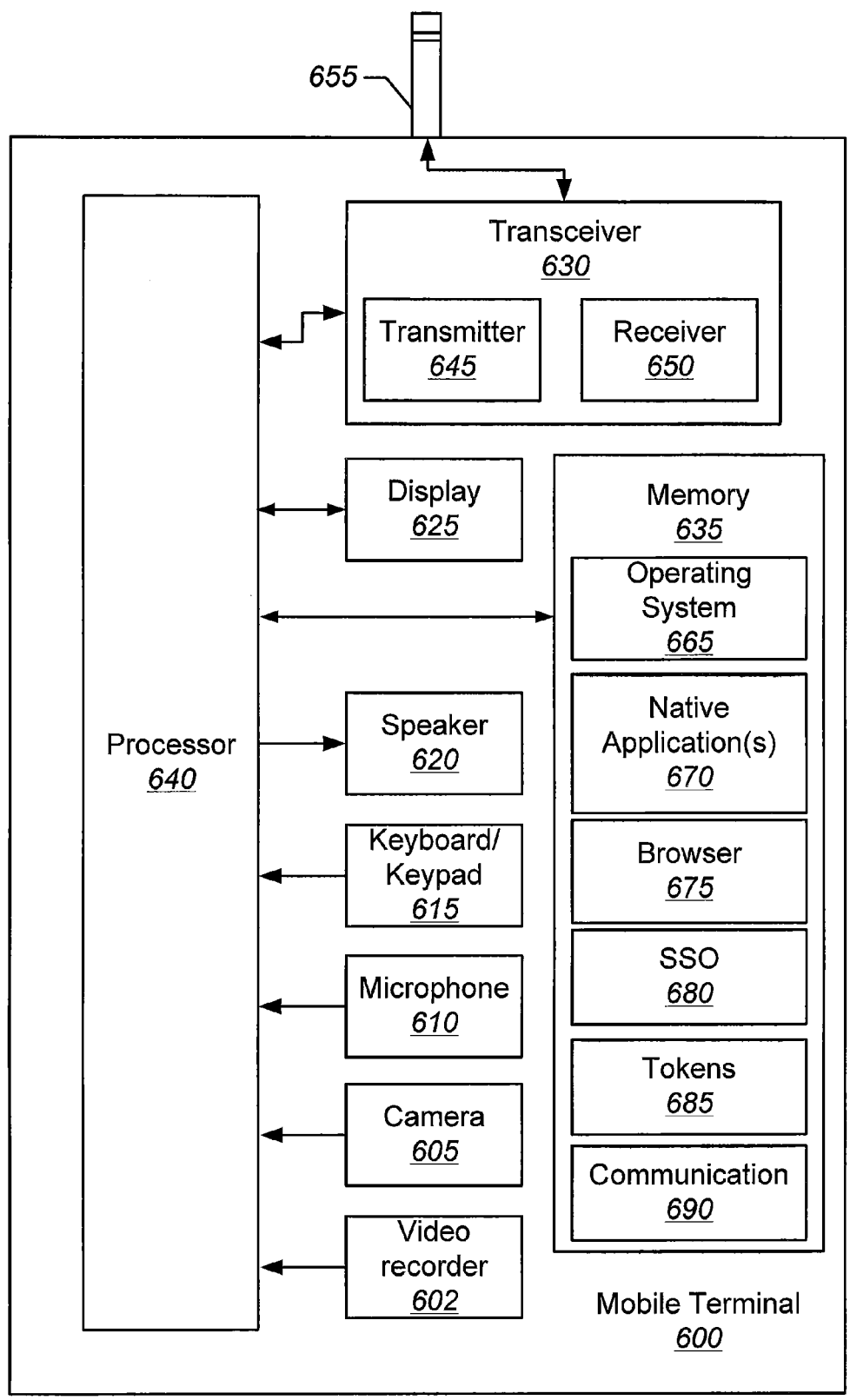
FIG. 6 is a block diagram that illustrates an electronic device/mobile terminal in accordance with some embodiments of the present inventive subject matter.

Referring now to FIG. 6, an exemplary mobile terminal 600 that may be used to implement the mobile terminal 105 of FIG. 1, in accordance with some embodiments of the inventive subject matter, includes a video recorder 602, a camera 605, a microphone 610, a keyboard/keypad 615, a speaker 620, a display 625, a transceiver 630, and a memory 635 that communicate with a processor 640. The transceiver 630 comprises a transmitter circuit 645 and a receiver circuit 650, which respectively transmit outgoing radio frequency signals to base station transceivers and receive incoming radio frequency signals from the base station transceivers via an antenna 655. The radio frequency signals transmitted between the mobile terminal 600 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 600 may be included in many conventional mobile terminals and their functionality is generally known to those skilled in the art.

The processor 640 communicates with the memory 635 via an address/data bus. The processor 640 may be, for example, a commercially available or custom microprocessor. The memory 635 is representative of the one or more memory devices containing the software and data used to provide a phone-based Web server with a private IP address, in accordance with some embodiments of the present invention. The memory 635 may include, but is not limited to, the following types of devices: cache, ROM, PROM, EPROM, EEPROM, flash, SRAM, and DRAM.

As shown in FIG. 6, the memory 635 may contain up to six or more categories of software and/or data: the operating system 665, native application(s) 670, a browser 675, a SSO module 680, tokens 685, and a communication module 690.

The operating system 6665 generally controls the operation of the mobile terminal 600. In particular, the operating system 665 may manage the mobile terminal's software and/or hardware resources and may coordinate execution of programs by the processor 640.

The native application(s) 670 may represent those applications that are installed directly onto the mobile terminal 600. Users typically acquire these applications through online stores or marketplaces.

The browser module 675 is a software application for retrieving, presenting, and traversing information resources on the Internet or World Wide Web. An information resource is identifies by a Uniform Resource Identifier (URI/URL) and may be a web page, image, video, or other piece of content.

The SSO module 680 may correspond to the SSO module 110 of FIG. 1 and be configured to configured to communicate with the identity server 135 to obtain an identity assertion that can be used when a user accesses a native application 670 on the mobile terminal 600 and/or when using the browser to access a Web resource, such as a mobile Web application provided through the service provider server 130.

The tokens module 685 represents electronic information that can be passed between the mobile terminal 600 and the identity server 135. When identity credentials for a particular user are provided to the identity server 135, the identity server 135 may provide a token to the mobile terminal 600 that can be used when requesting a identity assertion from the identity server 135 so as to alleviate the need for the user to re-enter the identity credentials.

The communication module 690 may be configured to facilitate communication between the mobile terminal 105/600 and other entities, such as the enterprise 125, service provider server 130, identity server 135, and MAM server 140.

Although FIG. 6 illustrates an exemplary software and hardware architecture that may be used to provide a mobile terminal that can provide an SSO capability for users according to some embodiments of the inventive subject matter, it will be understood that embodiments of the present invention are not limited to such a configuration, but are intended to encompass any configuration capable of carrying out the operations described herein.

Computer program code for carrying out operations of data processing systems discussed above with respect to FIGS. 1-6 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the MAM server 140, identity server 135, data processing system 200, hardware/software architecture of FIG. 3, data processing system 400, hardware/software architecture of FIG. 5, and mobile device 105/600 of FIGS. 1 and 6 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Figure 7:
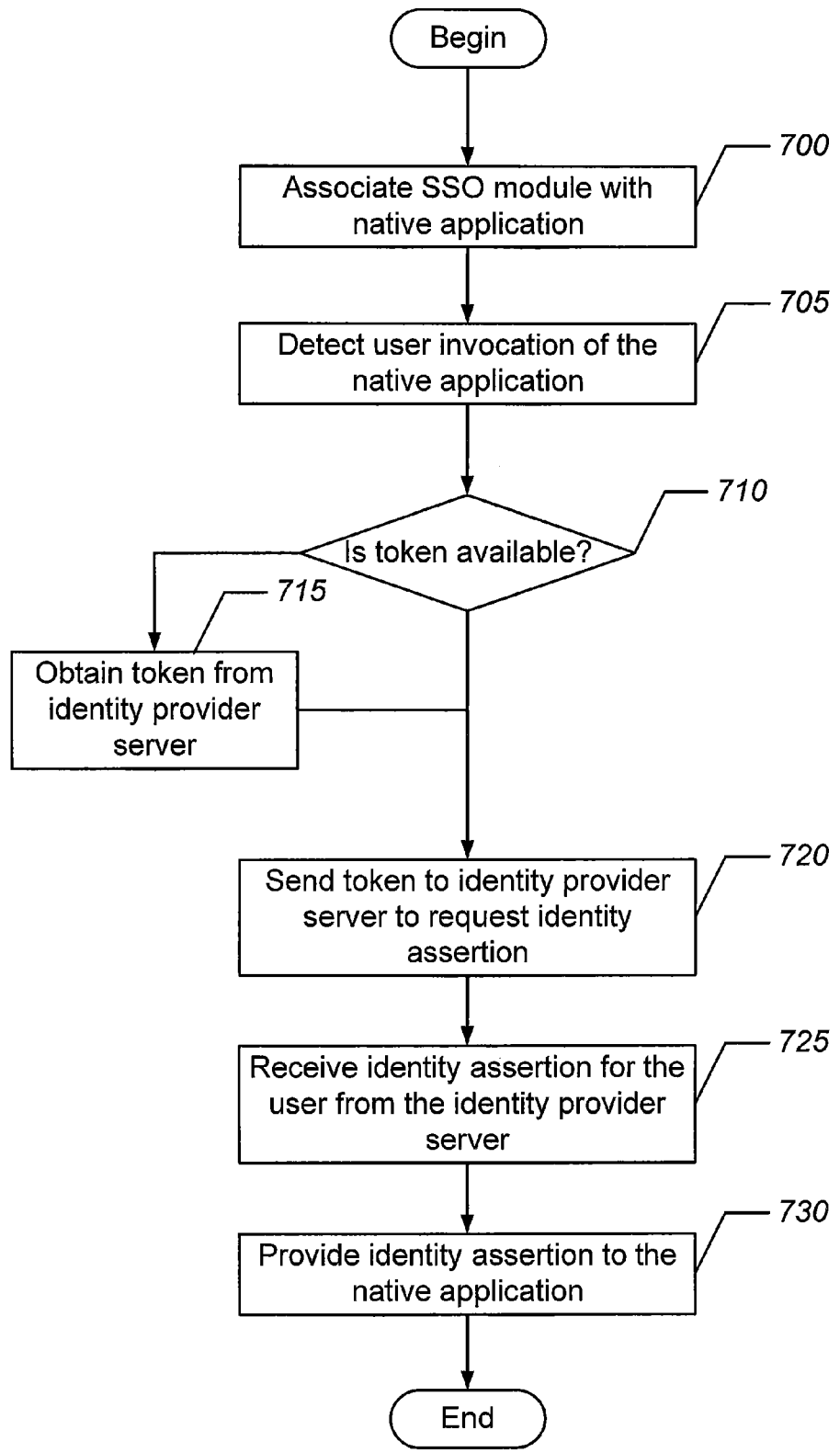
FIGS. 7-9 are flowcharts that illustrate operations for providing a SSO capability in a mobile device in accordance with some embodiments of the inventive subject matter.
Figure 8:
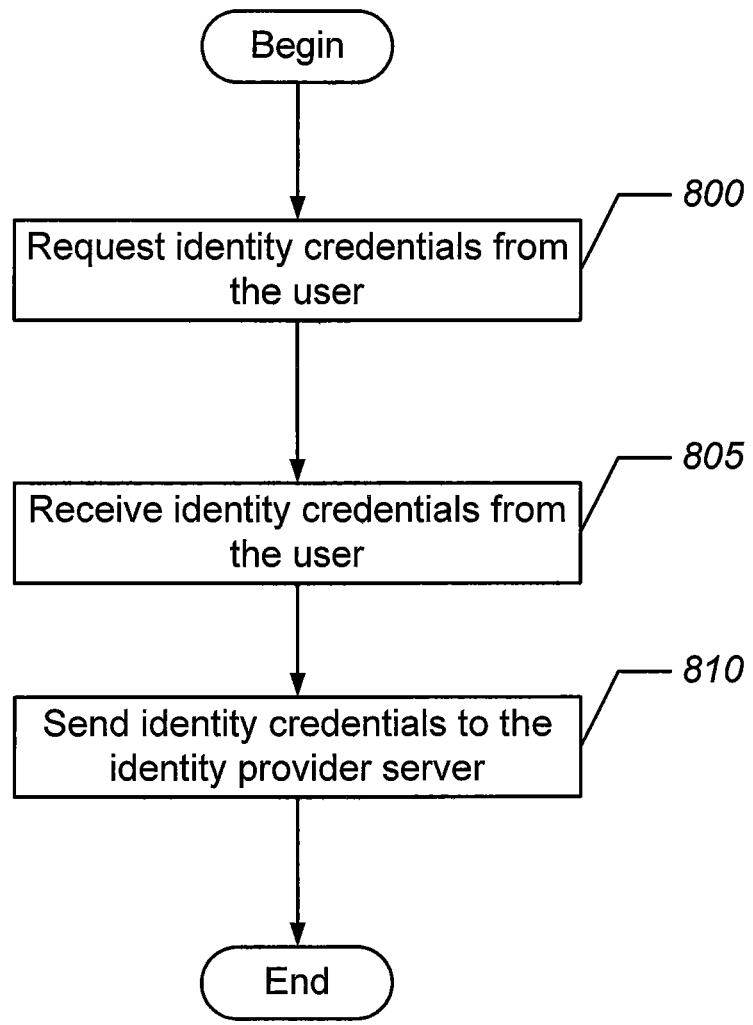
Figure 9:
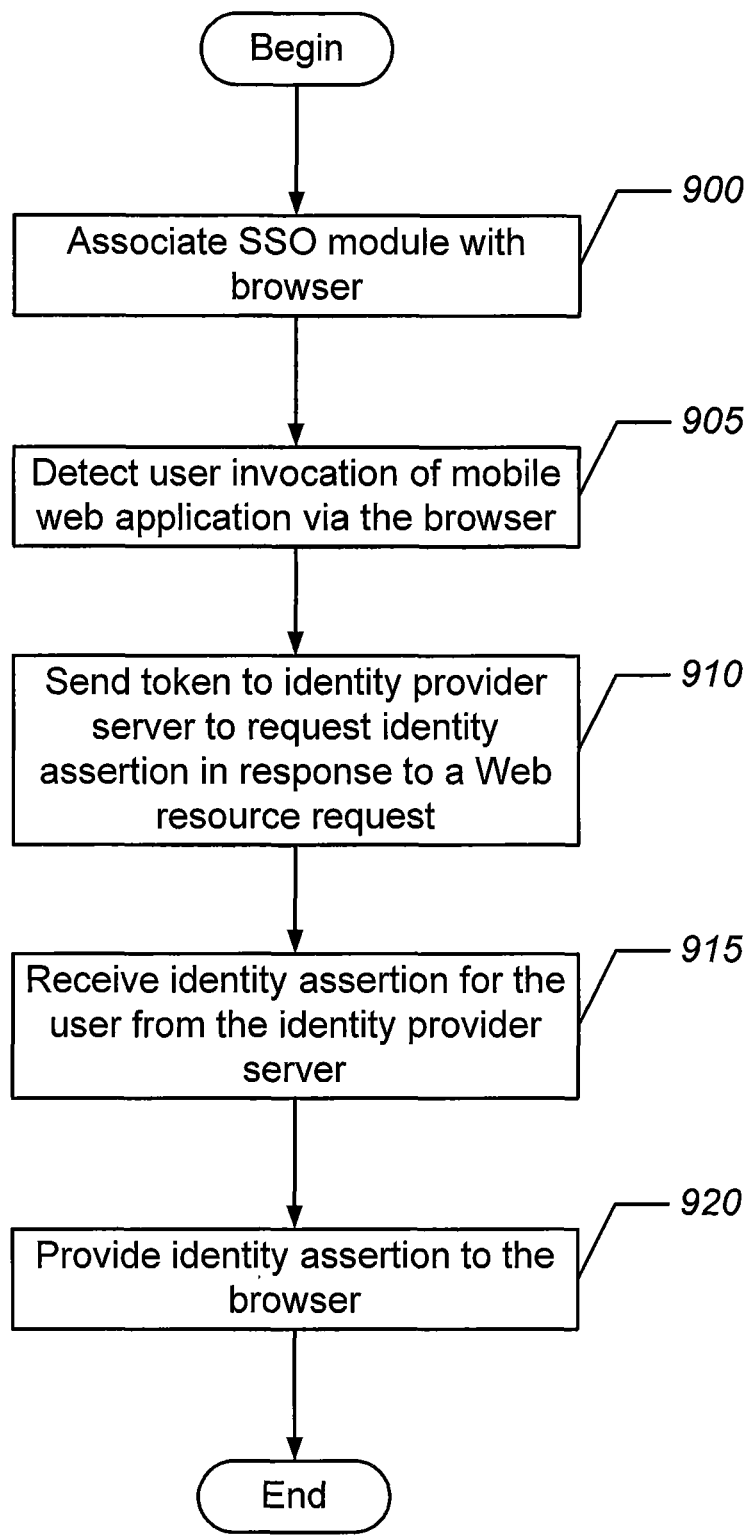

FIGS. 7-9 are flowcharts that illustrate operations for providing a SSO capability in a mobile device in accordance with some embodiments of the inventive subject matter.

Referring to FIG. 7, operations begin at block 700 where the mobile device 105 may download the SSO module 680 from the MAM server 140 and associate the SSO module 680 with a native application 670. The SSO module 680 detects a user has invoked the native application 670 at block 705. At block 710, the SSO module 680 determines whether a token is available for the user that indicates that the user has previously been authenticated with the identity server 135. If a token for the user is currently expired (i.e., the token has an expiration date associated therewith that has passed and, therefore, the token is invalid) or a token for the user is not present on the mobile device 105, then the SSO module 680 obtains a token for the user from the identity server 135.

FIG. 8 is a flowchart that illustrates exemplary operations for obtaining a token from the identity server 135 for a user. Operations begin at block 800 where the SSO module 680 requests identity credentials from a user of the mobile device through, for example, a login pop-up window or screen. The SSO module 680 receives the identity credentials from the user at block 805 and transmits these identity credentials to the identity server 135 at block 810. After authenticating the user based on the identity credentials, the identity server 135 sends a token back to the SSO module 680 that represents the user has been authenticated by the identity server 135. As described above, the identity credentials may be based on multi-factor authentication rather than solely being based on user name and password in accordance with other embodiments of the inventive subject matter.

Returning to FIG. 7, operations continue at block 720 where SSO module 680 obtains the token and may suppress a log in procedure for the native application 670 and sends the token for the user to the identity server 135 to request an identity assertion. Upon receiving the token and request for an identity assertion for the user, the identity server 135 sends an identity assertion, such as an SAML identity assertion to the SSO module 680 at block 725. The SSO module 680 provides the identity assertion to the native application 670 at block 730 to allow the native application 670 to include the identity assertion in a request to access a resource provided by the service provider server 130. The identity assertion may allow the user to access the resource provided through the service provider sever 130 without the need to provide identity credentials as the user has already been authenticated.

Referring now to FIG. 9, in other embodiments of the inventive subject matter, operations being at block 900 where the mobile device 105 may download the SSO module 680 from the MAM server 140 and associate the SSO module 680 with a browser 675. The SSO module 680 detects a user has invoked the browser 675 at block 905. As discussed above with respect to blocks 710 and 715 of FIG. 7, if a token is not available or has expired for the user, then the SSO module 680 will communicate with the identity server 135 to obtain a token. At block 910 the SSO module 680 determines that the user has attempted to access a Web resource, such as a mobile Web application provided by the service provider server 130, via a URL through the browser 675 and redirects this request so as to obtain and send the token for the user to the identity server 135 to request an identity assertion. Upon receiving the token and request for an identity assertion for the user, the identity server 135 sends an identity assertion, such as an SAML identity assertion, to the SSO module 680 at block 915. The SSO module 680 provides the identity assertion to the browser 675 at block 920 to allow the browser 675 to include the identity assertion in a request to access the resource provided by the service provider server 130. The identity assertion may allow the user to access the resource, such as the mobile Web application, provided through the service provider sever 130 without the need to provide identity credentials as the user has already been authenticated.

The SSO capability for mobile devices according to the embodiments described above may improve a user's experience with a mobile device as there is no need to enter credentials every time a native application is accessed and/or every time an attempt is made to access a mobile Web application or other Web resource through a browser. Enterprise security may also be improved as credentials are not transmitted multiple times or stored in a local login/password manager. Tokens are provided from an identity provider server to a mobile device, which the mobile device can use to request an identity assertion from the identity provider server. The number of tokens as well as expiration dates on the tokens can be used to control how often the mobile device needs to be re-authenticated. The identity provider server may be independent of the service provider server from which the mobile device request a Web resource.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method of operating a mobile device, the method comprising:
   performing operations as follows on a processor of the mobile device:
   associating, by the processor of the mobile device, a single sign on module with a native application residing on the mobile device;
   detecting, by the processor of the mobile device using the single sign on module, user invocation of the native application, the native application to request access to a resource from a service provider server;
   determining, by the processor of the mobile device using the single sign on module, whether the mobile device has a token stored thereon that indicates the user has been previously authenticated with an identity provider server;

requesting, by the processor of the mobile device using the single sign on module, identity credentials from the user when the token is determined not to be stored on the mobile device;

receiving, at the processor of the mobile device using the single sign on module, the identity credentials from the user;

sending, by the processor of the mobile device using the single sign on module, the identity credentials to the identity provider server;

receiving, at the processor of the mobile device using the single sign on module, a plurality of tokens including the token from the identity provider server;

sending, by the processor of the mobile device using the single sign on module, the token to the identity provider server to request an identity assertion;

receiving, at the processor of the mobile device using the single sign on module, the identity assertion for the user from the identity provider server responsive to sending the token to the identity provider server to request the identity assertion; and providing, by the processor of the mobile device using the single sign on module, the identity assertion to the native application;

sending, by the processor of the mobile device using the native application, a request to access the resource to the service provider server, the request to access the resource comprising the identity assertion; and providing, by the processor of the mobile device using the native application, access to the resource to the service provider server based on the identity assertion after sending the request;

wherein the service provider server is independent of the identity provider server.

2. The method of claim 1, further comprising:
wherein the identity assertion comprises a Security Association Markup Language (SAML) identity assertion.

3. The method of claim 1, wherein the identity credentials comprise a user name and a user password.

4. The method of claim 1, wherein the identity credentials comprise multi-factor authentication credentials comprising answers to multiple questions.

5. The method of claim 4, wherein the identity credentials comprise a username, a user password, and the multi-factor authentication credentials comprising answers to multiple questions.

6. The method of claim 1, wherein the token has an expiration date associated therewith, the token being invalid after the expiration date.

7. A method of operating a mobile device, the method comprising:
performing operations as follows on a processor of the mobile device:
associating, by the processor of the mobile device, a single sign on module with a browser residing on a mobile device;
detecting, by the processor of the mobile device using the single sign on module, user invocation of a Web resource provided by a service provider server using the browser;
determining, by the processor of the mobile device using the single sign on module, whether the mobile device has the token stored thereon responsive to user invocation of the browser;

requesting, by the processor of the mobile device using the single sign on module, identity credentials from the user when the token is determined not to be stored on the mobile device;

receiving, at the processor of the mobile device using the single sign on module, the identity credentials from the user;

sending, by the processor of the mobile device using the single sign on module, the identity credentials to the identity provider server;

receiving, at the processor of the mobile device using the single sign on module, a plurality of tokens including the token from the identity provider server;

sending, by the processor of the mobile device using the single sign on module, the token to an identity provider server to request an identity assertion, the token indicating that the user has been previously authenticated with the identity provider server;

receiving, at the processor of the mobile device using the single sign on module, the identity assertion for the user from the identity provider server responsive to sending the token to the identity provider server to request the identity assertion; and providing, by the processor of the mobile device using the single sign on module, the identity assertion to the browser;

sending, by the processor of the mobile device using the browser, a request to access the Web resource to the service provider server, the request to access the resource comprising the identity assertion; and providing, by the processor of the mobile device using the native application, access to the resource to the service provider server based on the identity assertion after sending the request;

wherein the service provider server is independent of the identity provider server.

8. The method of claim 7, further comprising:
wherein the identity assertion comprises a Security Association Markup Language (SAML) identity assertion.

9. The method of claim 7, wherein the identity credentials comprise a user name and a user password.

10. The method of claim 7, wherein the identity credentials comprise multi-factor authentication credentials comprising answers to multiple questions.

11. The method of claim 10, wherein the identity credentials comprise a username, a user password, and the multi-factor authentication credentials comprising answers to multiple questions.

12. The method of claim 7, wherein the token has an expiration date associated therewith, the token being invalid after the expiration date.

13. A computer program product, comprising:
a non-transitory computer readable storage medium comprising computer readable program code embodied in the medium that when executed by a processor of a mobile device causes the processor of the mobile device to perform operations comprising:
associating, by the processor of the mobile device, a single sign on module with a native application residing on the mobile device;
detecting, by the processor of the mobile device using the single sign on module, user invocation of the native application, the native application to request access to a resource from a service provider server;
determining, by the processor of the mobile device using the single sign on module, whether the mobile device has a token stored thereon that indicates the user has been previously authenticated with an identity provider server;

requesting, by the processor of the mobile device using the single sign on module, identity credentials from the user when the token is determined not to be stored on the mobile device;

receiving, at the processor of the mobile device using the single sign on module, the identity credentials from the user;

sending, by the processor of the mobile device using the single sign on module, the identity credentials to the identity provider server;

receiving, at the processor of the mobile device using the single sign on module, a plurality of tokens including the token from the identity provider server;

sending, by the processor of the mobile device using the single sign on module, the token to the identity provider server to request an identity assertion;

receiving, at the processor of the mobile device using the single sign on module, the identity assertion for the user from the identity provider server responsive to sending the token to the identity provider server to request the identity assertion;

providing, by the processor of the mobile device using the single sign on module, the identity assertion to the native application;

sending, by the processor of the mobile device using the native application, a request to access the resource to the service provider server, the request to access the resource comprising the identity assertion; and providing, by the processor of the mobile device using the native application, access to the resource to the service provider server based on the identity assertion after sending the request;

wherein the service provider server is independent of the identity provider server.

14. The computer program product of claim 13, wherein the identity credentials comprise multi-factor authentication credentials comprising answers to multiple questions.

15. The computer program product of claim 13, wherein the token has an expiration date associated therewith, the token being invalid after the expiration date.

16. The computer program product of claim 14, wherein the identity credentials comprise a username, a user password, and the multi-factor authentication credentials comprising answers to multiple questions.

17. The computer program product of claim 13, further comprising:

wherein the identity assertion comprises a Security Association Markup Language (SAML) identity assertion.

* * * * *